(12) United States Patent
Buchanan

(10) Patent No.: US 9,850,926 B2
(45) Date of Patent: Dec. 26, 2017

(54) MOUNT LOCKING SYSTEM

(71) Applicant: Chad M. Buchanan, Mequon, WI (US)

(72) Inventor: Chad M. Buchanan, Mequon, WI (US)

( * ) Notice: Subject to any disclaimer, the term of this patent is extended or adjusted under 35 U.S.C. 154(b) by 50 days.

(21) Appl. No.: 14/524,587

(22) Filed: Oct. 27, 2014

(65) Prior Publication Data

US 2016/0115978 A1    Apr. 28, 2016

(51) Int. Cl.
| | | |
|---|---|---|
| F16B 2/22 | (2006.01) | |
| F16B 2/08 | (2006.01) | |
| B62J 11/00 | (2006.01) | |
| F16M 11/16 | (2006.01) | |
| F16M 13/00 | (2006.01) | |
| F16M 13/02 | (2006.01) | |

(52) U.S. Cl.
CPC ............. *F16B 2/22* (2013.01); *B62J 11/00* (2013.01); *F16B 2/08* (2013.01); *F16M 11/16* (2013.01); *F16M 13/00* (2013.01); *F16M 13/02* (2013.01)

(58) Field of Classification Search
CPC .... F16B 2/22; F16B 2/08; F16M 11/06; B62J 11/00
USPC ........................................ 361/679.21, 679.22
See application file for complete search history.

(56) References Cited

U.S. PATENT DOCUMENTS

| | | | | |
|---|---|---|---|---|
| 5,274,885 A * | 1/1994 | Hellweg | .................... | A45F 5/02 224/272 |
| 6,302,617 B1 * | 10/2001 | Rumpp | .................... | B60D 1/52 285/401 |
| 6,786,372 B2 * | 9/2004 | Enkerlin | .................... | A45F 5/02 224/196 |
| 8,238,086 B2 * | 8/2012 | Ou | .................... | F16M 11/04 361/679.21 |
| 9,038,971 B1 * | 5/2015 | Guthrie | ................. | F16M 13/022 248/121 |
| 2008/0296333 A1 * | 12/2008 | Brassard | ................. | B60R 11/02 224/555 |
| 2012/0252543 A1 * | 10/2012 | Cho | ..................... | F16M 11/041 455/575.8 |
| 2013/0134267 A1 * | 5/2013 | Liu | ......................... | F16M 11/10 248/122.1 |
| 2013/0181584 A1 * | 7/2013 | Whitten | ................ | G06F 1/1656 312/223.1 |
| 2014/0028243 A1 * | 1/2014 | Rayner | .................... | G06F 1/163 320/103 |
| 2014/0060218 A1 * | 3/2014 | Bisesti | .................... | F16M 11/04 73/865.8 |

(Continued)

OTHER PUBLICATIONS

Topeak RideCase; http://www.modernbike.com/product-2126196426?gclid=CJjf66fNzcECFRY0aQodY3QAww, Oct. 27, 2014.

(Continued)

*Primary Examiner* — Beth Stephan
(74) *Attorney, Agent, or Firm* — Rathe Lindenbaum LLP

(57) ABSTRACT

An apparatus comprises a panel, a cavity extending into the panel, a plurality of overhangs cantilevered from a perimeter of the cavity and catches resiliently projecting from a portion of a floor of the cavity. The overhangs define an insertion opening for a lock. The catches are oriented respect to the insertion opening such that the catches deflect by a first extent when the lock is positioned at a depth within the cavity below the overhangs and such that the catches deflect by a second greater extent during rotation of the lock to beneath the overhangs.

19 Claims, 19 Drawing Sheets

(56) References Cited

U.S. PATENT DOCUMENTS

2014/0265765 A1* 9/2014 Khodapanah .......... F16M 13/02
312/223.1

OTHER PUBLICATIONS

Quad Lock Bike Mount; http://www.quadlockcase.com/products/iphone-6-bike-mount-kit?utm_medium=cpc&utm_source=googlepla&variant=875503797&gclid=COm4lKfOzcECFQcSMwodfG4A3Q, Oct. 27, 2014.
Garmin Out Front Bike Mount; https://buy.garmin.com/en-US/US/shop-by-accessories/mounts/out-front-bike-mount/prod114881.html, Oct. 27, 2014.

* cited by examiner

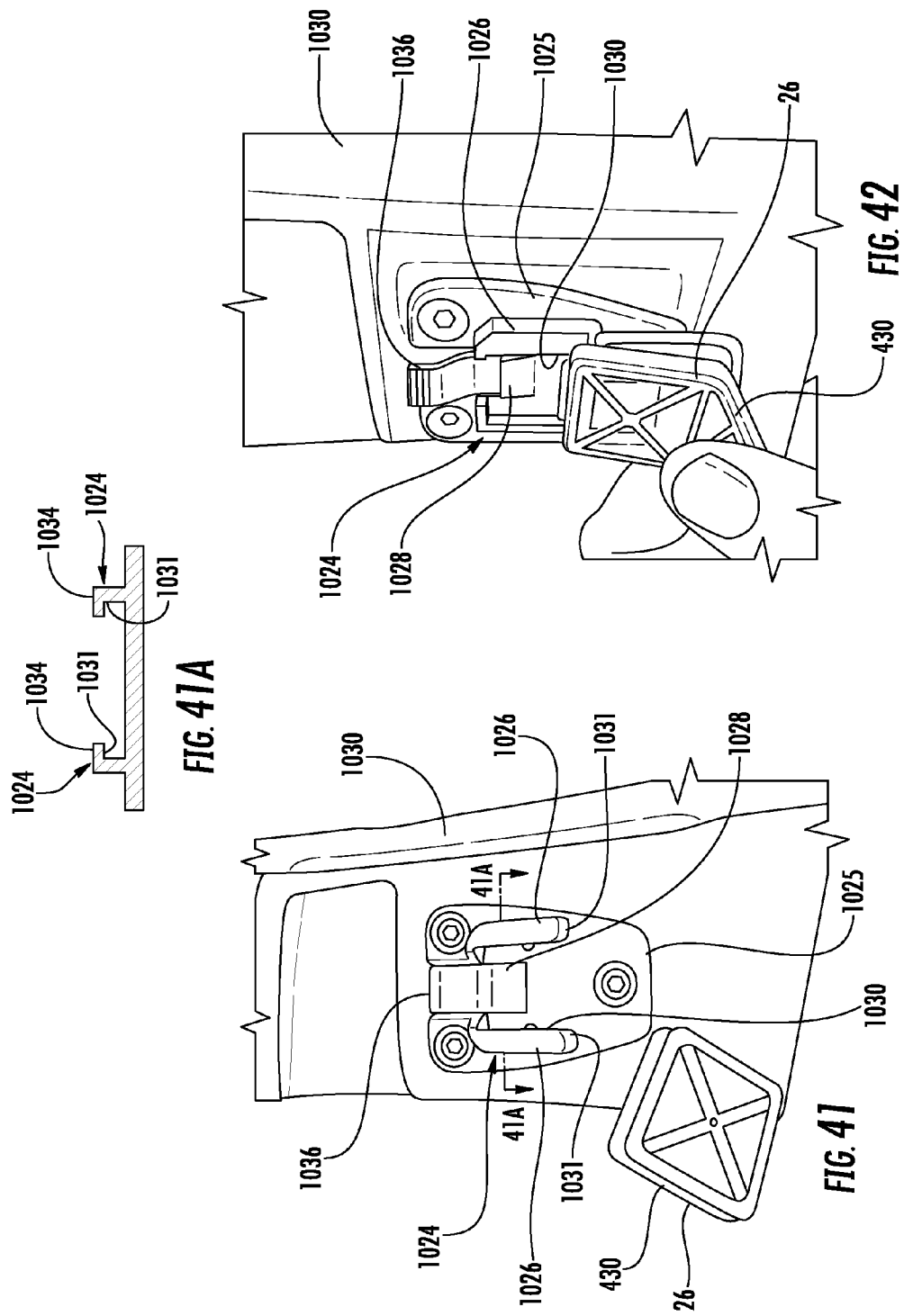

MOUNT LOCKING SYSTEM

BACKGROUND

The portability of electronic devices has led to the creation of various mounts for securing the electronic devices. For example, electronic devices such as tablet computers, smart phones, personal data assistants, still and video cameras are now being mounted to bikes, paddle boards, helmets, and the like. Unfortunately, existing mounts are sometimes unreliable or are difficult to connect the electronic device to the mount.

BRIEF DESCRIPTION OF THE DRAWINGS

FIG. 41 is perspective view of the example mount of FIG. 24 for connection with another example female lock receiver.

FIG. 41A is a sectional view of the female lock receiver of FIG. 41 taken along line 41A-41A.

FIG. 42 is a perspective view illustrating insertion of the mail lock of FIG. 41 into the female lock receiver of FIG. 41.

DETAILED DESCRIPTION OF EXAMPLES

Figure 1:
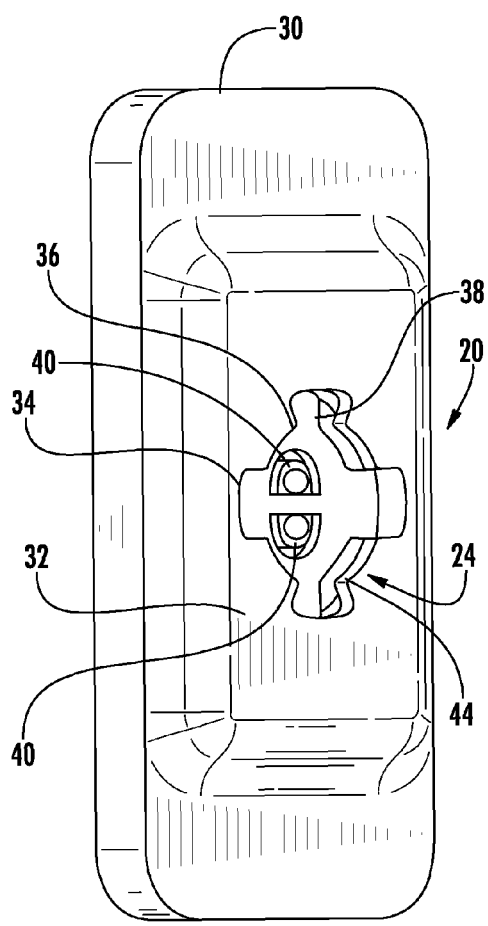
FIG. 1 is a rear perspective view of an example female lock receiver provided on an electronics device case.
Figure 2:
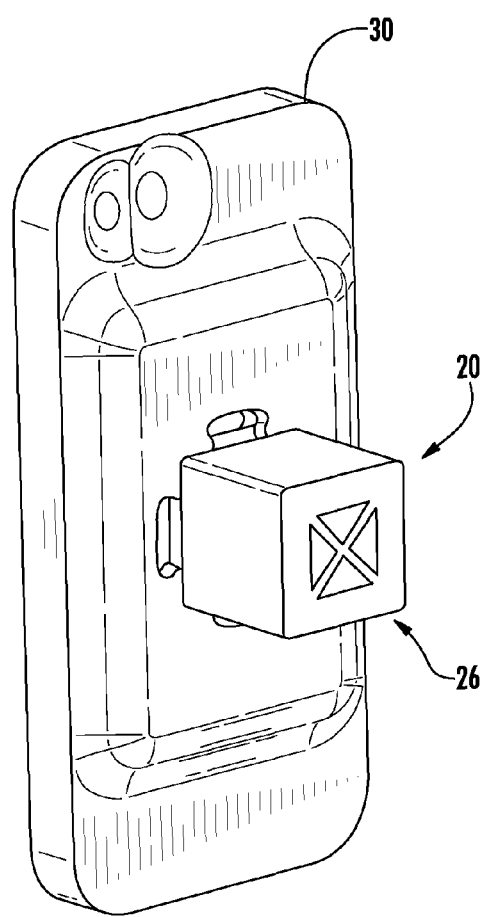
FIG. 2 is a rear perspective view of the female lock receiver of FIG. 1 receiving an example male lock.

FIGS. 1 and 2 illustrates an example mount locking system 20. Mount locking system 20 is configured to releasably secure an electronic device to another structure, such as a bicycle, a helmet, a paddleboard or other mobile article or vehicle. As will be described hereafter, mount locking system 20 facilitates easier mounting of an electronic device in a reliable manner.

Mount locking system 20 comprises female lock receiver 24 and male lock 26. Female lock receiver 24 comprise the structure which removably receives a portion of mail lock 26. Female lock receiver 24 cooperates with mail lock 26 to secure electronic device in a desired orientation relative to a structure which supports lock 26. In the example illustrated in FIG. 1, female lock receiver 24 is formed in an electronic case 30 which removably receives an electronic device, such as a smart phone, flash memory player, personal data assistant or tablet computer. In the example illustrated, female lock receiver 24 is integrally formed as part of a single unitary body with electronic case 30. In other implementations, female lock receiver 24 is removably or fixedly mounted, welded, bonded or fastened to electronic case 30. In yet another implementation, the low lock receiver 24 is integrally formed as part of a single unitary body with the housing of the electronic device 30 itself or is fixedly mounted, welded, bonded or fastened directly to a housing of the electronic device itself.

As shown by FIG. 1, female lock receiver 24 comprises panel 32, cavity 34, overhangs 36, cavity floor 38 and catches 40. Cavity 34 comprise an opening extending through panel 32. As noted above, in one implementation come panel 32 is integrally formed as part of a single unitary body as part of case 30. In other implementations, panel 32 is part of a structure that is removably or fixedly fastened, welded, bonded to case 30. In yet other implementations, panel 32 is part of a structure that is removably or fixedly mounted directly to a housing of the electronic device itself or is integrally formed as part of the electronic device housing. Because the portion of lock mounting system 20 carried by case 30 (or the housing electronic device itself) comprises a female member comprising cavity 34, case 30 (or the housing of electronic device itself) omits structure that project from case 30 (or the housing electronic device itself). As a result, case 30 (or the housing electronic device itself) are less likely to inadvertently catch up on external objects and maybe more easily carried within a person's pocket.

Overhangs 36 comprise structures that project from panel 32 into and partially across cavity 34. Overhangs 36 define an insertion opening 44 through which lock 26 is freely inserted and withdrawn when aligned with insertion opening 44. In the example illustrated, overhangs 36 form a polygonal insertion opening 44 for receiving a corresponding polygonal shaped portion of lock 26. In the example illustrated, overhangs 36 form a square insertion opening 44 for receiving a correspondingly shaped square shaped portion of lock 26.

Cavity floor 38 comprise a structure supported within cavity 34 and below insertion opening 44 and overhangs 36. In one implementation, cavity floor 38 comprise a spring-like structure, configured to resiliently flex in a direction perpendicular to insertion opening 44. In another implementation, cavity floor 38 comprises a statute original fixed structure.

Catches 40 comprise two or more structures resiliently projecting from cavity floor 38 so as to resiliently flex or deflect relative to cavity floor 38 and relative to insertion opening 36. Catches 40 are configured to resiliently deflect as lock 26 is rotated within cavity 34 and to resiliently return to and on deflect in state or a lesser deflect of state by snapping or popping into corresponding recesses of lock 26. Catches 40 are oriented with respect to insertion opening 36 such that the catches 40 deflect by a first extent (which may be a zero extent) when lock 26 positioned at a depth within cavity 34 below overhangs 36 and such that catches 40 deflect by a second greater extent during rotation of lock 26 from an initially inserted position to beneath overhangs 36. In the example illustrated, catches 40 do not deflect and are in a default state during complete insertion of lock 26 into the cavity 34 against cavity floor 38. As a result, insertion of lock 26 into cavity 34 requires minimal or no deflection of catches 40, facilitating easier insertion of lock 26 into lock receiver 20.

In the example illustrated, catches 40 comprise a pair of semi spherical knobs configured to project upwardly into recesses in lock 26 when aligned with such recesses of lock 26. During rotation of lock 26 from initially inserted position to position which portion of lock 26 underlie overhangs 36, catches 40 ride against lock 26 and are deflected towards cavity floor 38 until lock 26 is withdrawn from cavity 34 or until catches 40 become aligned with recesses of lock 26.

Figure 3:
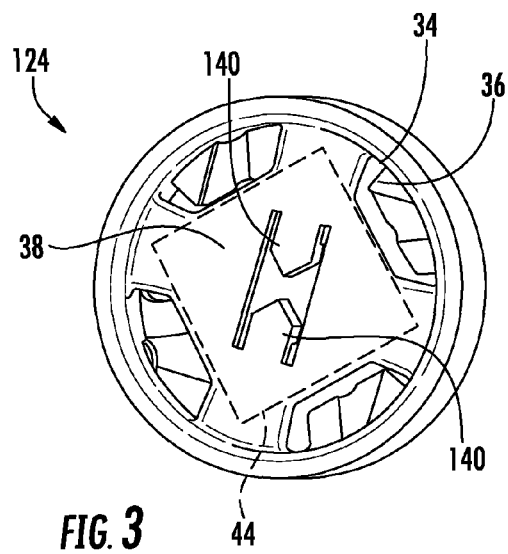
FIG. 3 is a perspective view of another example female lock receiver.
Figure 4:
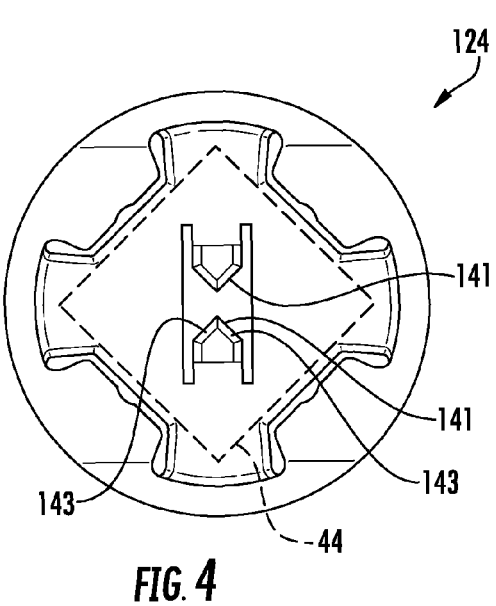
FIG. 4 is a front view of the female lock receiver of FIG. 3.

FIGS. 3 and 4 illustrate female lock receiver 124, an alternative implementation of female lock receiver 24. Female lock receiver 124 is similar to female lock receiver 20 except that female lock receiver 124 comprises catches 140 in lieu of catches 40. As with receiver 20, receiver 124 comprises cavity 34, overhangs 36, cavity floor 38, each of which has been described above.

In the example illustrated, catches 140 comprise a pair of opposite catches pointing towards one another and towards a center of insertion opening 44 (shown in broken lines in FIGS. 3 and 4). Each of catches 140 comprise a pointed tip 141 bounded on opposite sides by beveled ramps 143. Beveled ramps 143 facilitate deflection of catches 140 as lock 26 is rotated within cavity 40.

Figure 5:
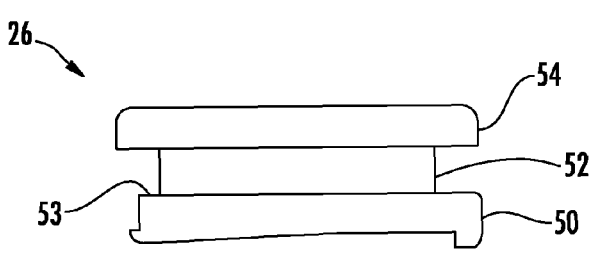
FIG. 5 is a side view of another example male lock.
Figure 6:
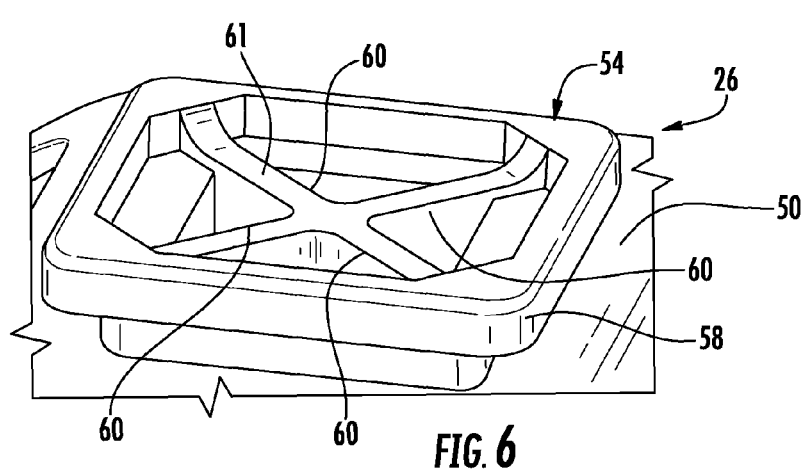
FIG. 6 is a fragmentary perspective view of the mail lock of FIG. 5.

FIGS. 5 and 6 illustrate one example of lock 26 in more detail. As shown by FIG. 5, lock 26 comprises base portion 50, neck 52 and head 54. Base portion 50 comprises that portion of lock 26 extending from a mounting structure that is itself fixedly or removably secured to the supporting structure such as a helmet, a bicycle, a paddleboard or the like. Neck 52 extends from base portion 50 and supports head 54. Neck 52 is recessed relative to head 54 so as to form an intermediate groove 53. Groove 53 extends about neck 52 and receives overhangs 36 when lock 26 is secured to lock receiver 24. Neck 52 is shaped so as to be completely contained within insertion opening 44, facilitating rotation of head 54 from an initially inserted position in which head 54 does not extend below overhangs 36 to a locked position in which portions of head 54 extend below overhangs 36.

Head 54 is supported by neck 52 and is configured to be inserted through insertion opening 44 (shown in FIGS. 3 and 4). Portions of head 54 are configured to be received within insertion opening 44 and to be rotated to positions beneath overhangs 36 such that lock 26 is secured within cavity 34. In the example illustrated, head 54 is polygonal, having corners 58 which are rotatable to positions beneath overhangs 36 for locking engagement. In the example illustrated, head 54 has a square shape with four corners 58 that fit between consecutive overhangs 36 when initially inserted into insertion opening 36 and that are rotatable against cavity floor 38 to positions beneath overhangs 36 such that grew 53 receives overhangs 36.

As shown by FIG. 6, head 54 additionally comprises recesses 60 sized and located to receive catches 40, 140 when head 54 is initially inserted into insertion opening 44 and when head 54 has been sufficiently rotated to position corners 58 of head 54 beneath overhangs 36 in a predefined angular orientation. In the example illustrated, recesses 60 comprise a pair of adjacent triangular-shaped recesses angularly oriented 90° from one another and pointing towards a center point of head 54. In the example illustrated, head 54 comprises four triangular shaped recesses 60 pointing towards the center point of head 54 and separated by crossbeams 61, each recess 60 being angled 90° with respect to an adjacent recess 60. As a result, head 54 is securable at two different locked states 180° apart from one another depending upon a desired orientation for the electronic device being mounted. In other implementations, head 54 may have other differently sized, shaped or located recesses 60.

Figure 7:
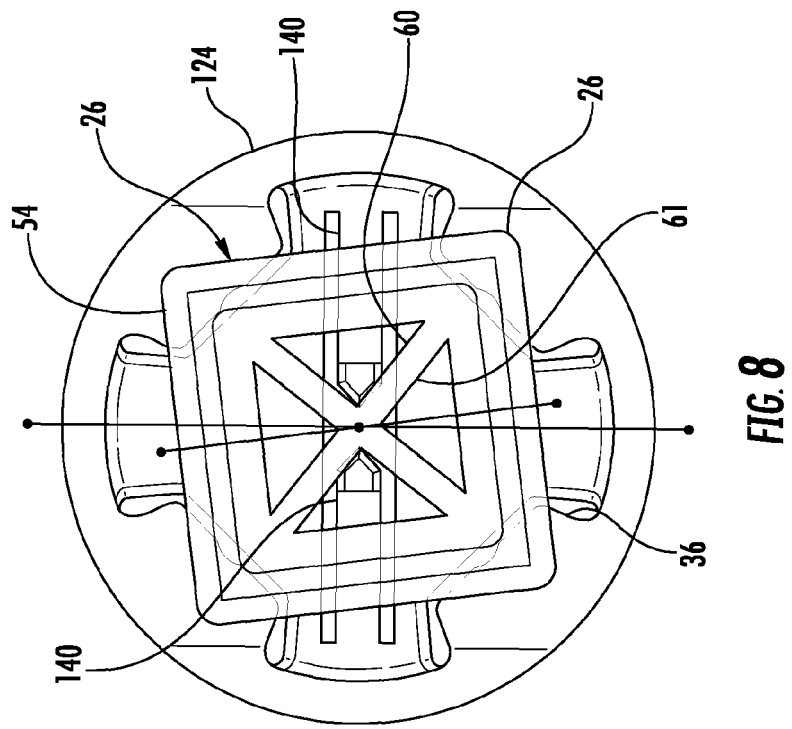
FIGS. 7-10 are front views of the mail lock of FIG. 5 being inserted into the female lock receiver of FIG. 3 and being actuated to a locked state.

FIGS. 7-12 illustrate interaction of lock 26 with lock receiver 124. FIG. 7 illustrates lock 26 inserted into insertion opening 40 with corners 58 of head 54 initially extending within gaps between consecutive overhangs 36. In the position shown in FIG. 7, lock 26 is free from locking engagement with receiver 124 such that a person may pull or lift lock 26 out of cavity 34. In the example illustrated, when head 54 of Lock 26 is in the position shown in FIG. 10, the raised surfaces or portions of catches 140 are received within two opposite recesses 60 of head 54 with minimal or no deflection. Crossbeams 61 extend between catches 140.

Figure 8:
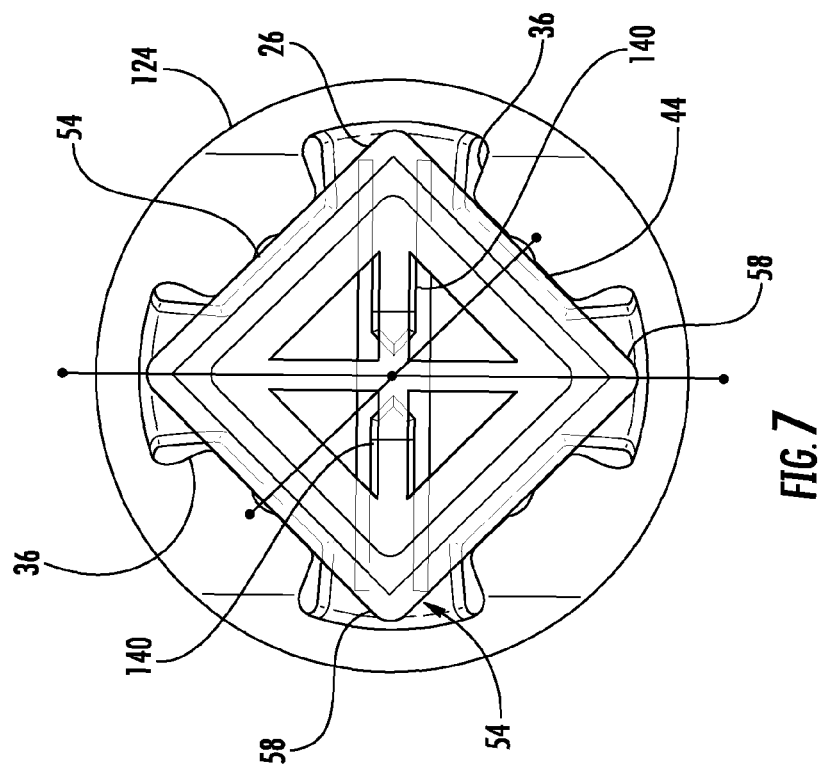
Figure 9:
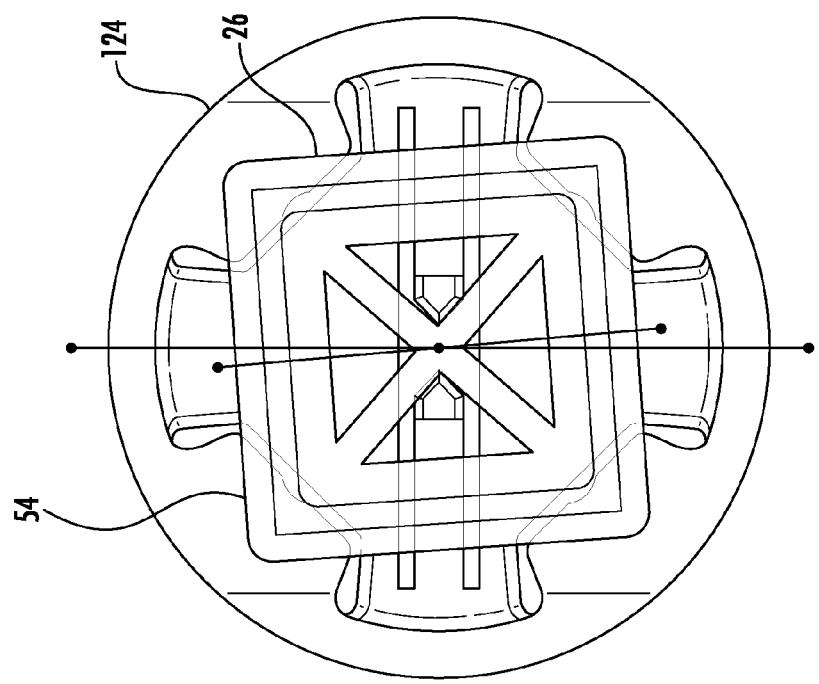

FIGS. 8 and 9 illustrate rotation of receiver 124 relative to lock 26. In the example illustrated, FIGS. 8 and 9 illustrate rotation of lock 26 in a clockwise direction. During such rotation, corners 58 of head 54 rotate to beneath overhangs 36. Crossing 61 engage the beveled edges 143 to resiliently deflect catches 140 upward, away from floor 38.

Figure 10:
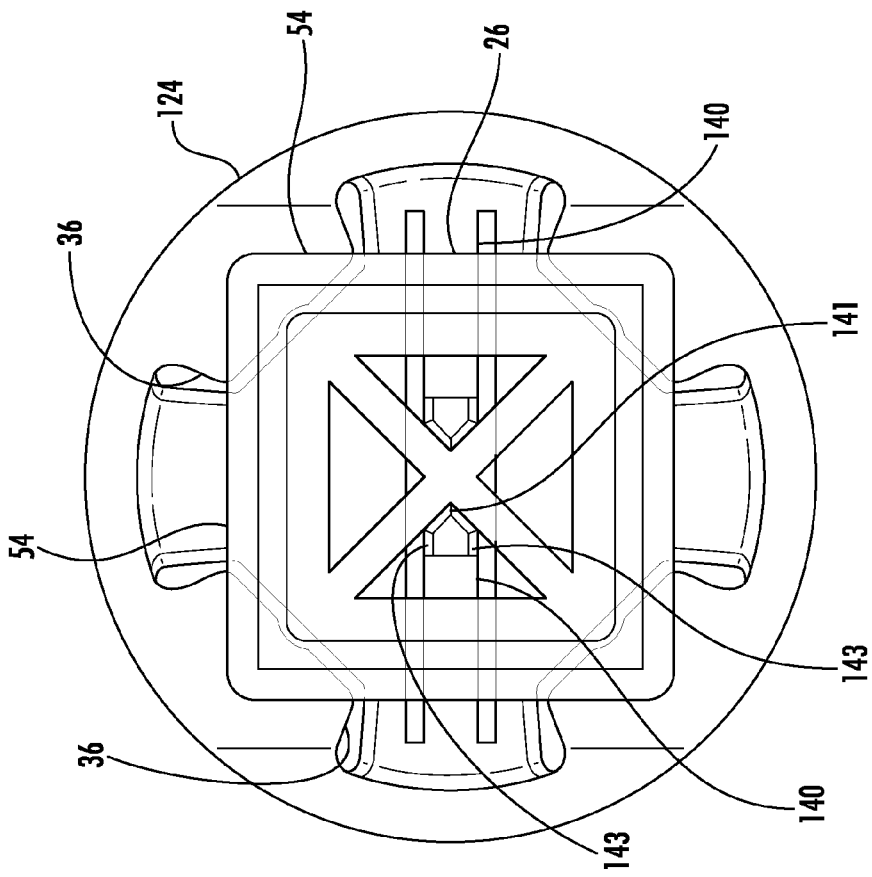
Figure 11:
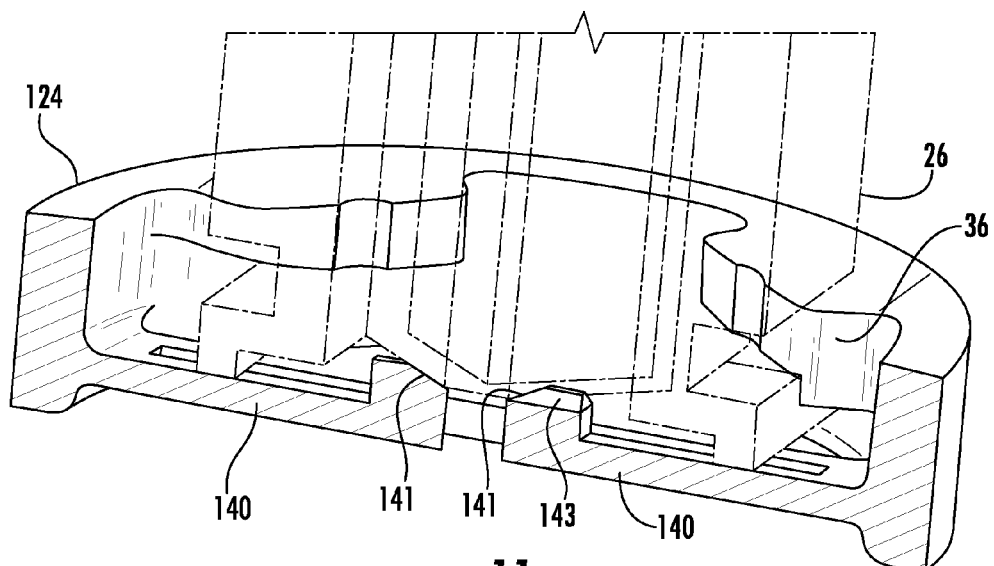
FIG. 11 is a sectional view of the mail lock and female lock receiver of FIGS. 7-10 with the mail lock in a locked state.
Figure 12:
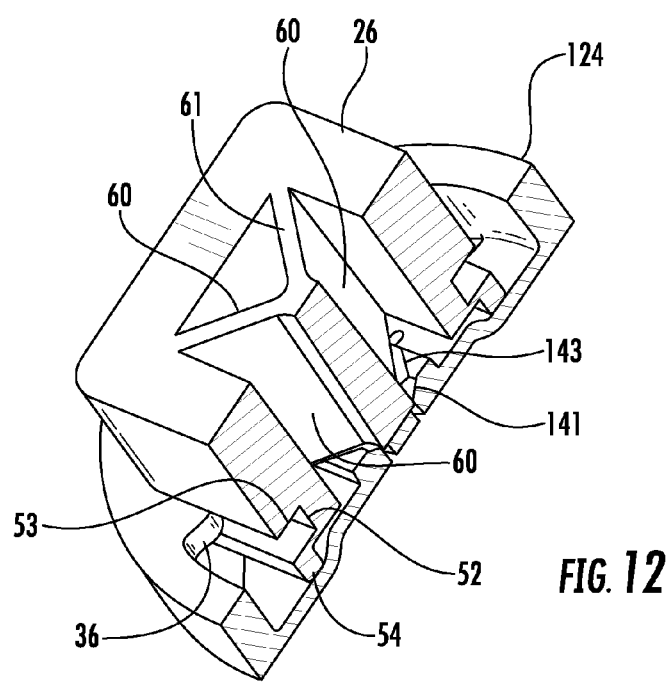
FIG. 12 is another sectional view of the mail lock and female lock receiver of FIGS. 7-10 with the mail lock in a locked state.

FIGS. 10-12 illustrate receiver 124 and lock 26 rotated to a position such that catches 140 are aligned with recesses 60. As a result, catches 140 resiliently return to their default state, projecting into recesses 60 to secure lock 26 against further accidental or inadvertent rotation relative to receiver 124. In the position shown in FIGS. 10-12, corners 58 of head 54 are retained beneath overhangs 36 by the reception of catches 140 within recesses 60. In such a state, grooves 53 receive overhangs 36. In the example illustrated, pointed ends 141 of catches 140 mate with corresponding corners of recesses 60, against two consecutive crossbeams 61, to securely retain lock 26 and receiver 20 against relative movement.

Figure 13:
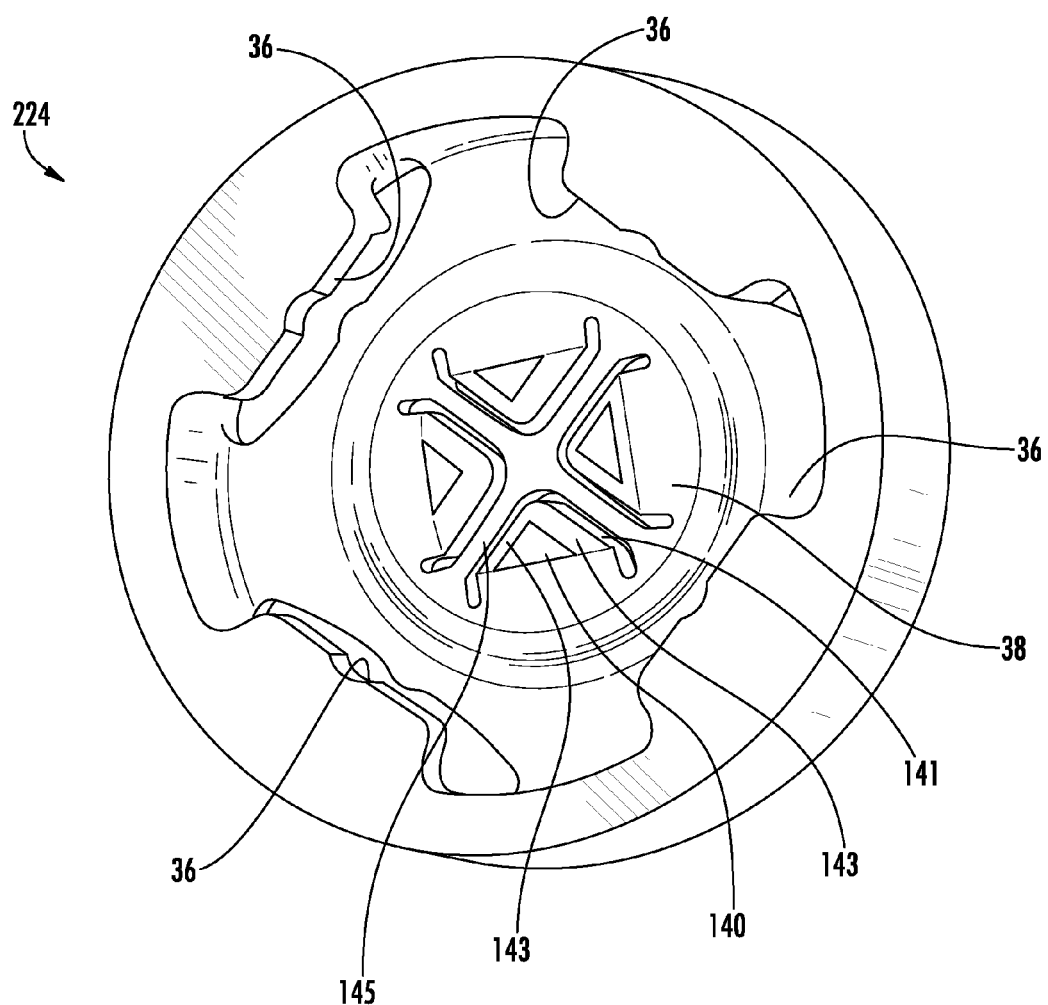
FIG. 13 is a perspective view of another example of a female lock receiver.

FIG. 13 illustrates female lock receiver 224, another example implementation of receiver 20. Receiver 224 is configured for use with lock 26 described in FIGS. 5 and 6. Receiver 224 is similar to receiver 124 except that receiver 224 comprises a second pair of opposing catches 140. In the example illustrated, each of the four catches 140 comprises a triangular protuberance pointing towards a center point of insertion opening 40. Each of catches 140 comprises a pointed tip 141 and a pair of beveled side edges 143. To strengthen cavity floor 38, cavity 430 additionally comprises a pair of angled crossbeams 145 extending between catches 140. In the example illustrated, each of catches 140 are offset 90° with respect to one another and are angularly offset by 45° from the corners of insertion opening 40.

Figure 14:
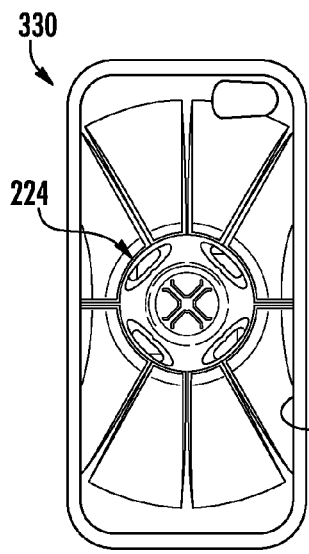
FIG. 14 is a front view of electronic device case including the female lock receiver of FIG. 13.
Figure 15:
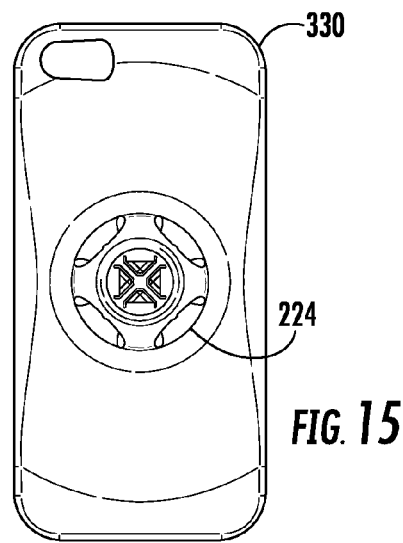
FIG. 15 is a rear view of the electronic device case of FIG. 14.
Figure 16:
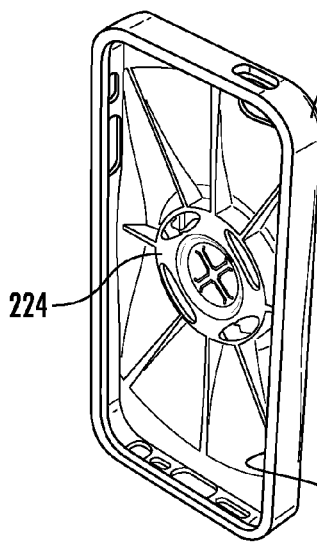
FIG. 16 is a front perspective view of the electronic device case of FIG. 14.
Figure 17:
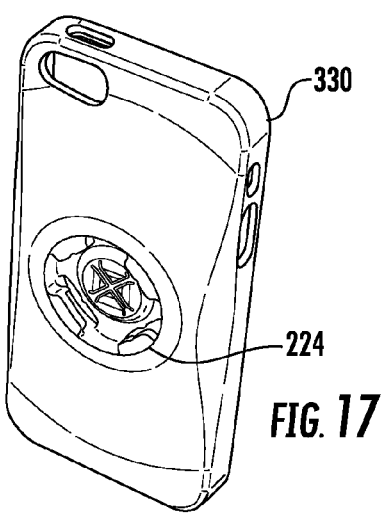
FIG. 17 is a rear perspective view of the electronic device case of FIG. 14.
Figure 18:
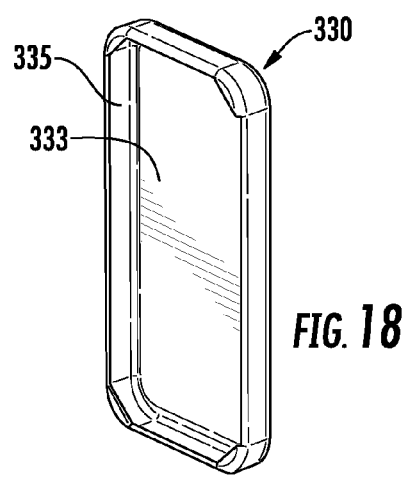
FIG. 18 is a front perspective view of electronic device case of FIG. 14 additionally comprising an inserted rain panel.
Figure 19:
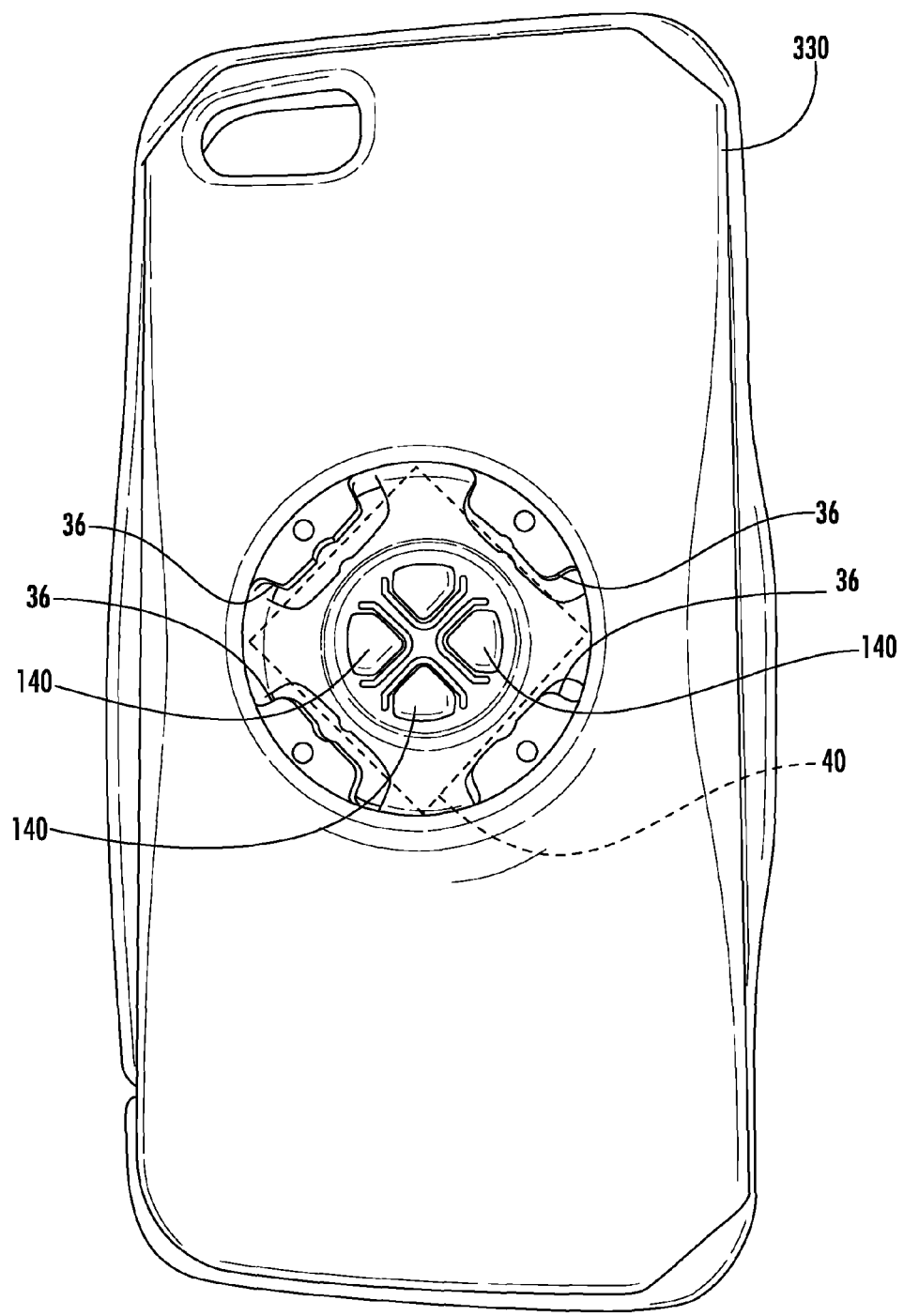
FIG. 19 is a rear view of the electronic device case of FIG. 14.
Figure 20:
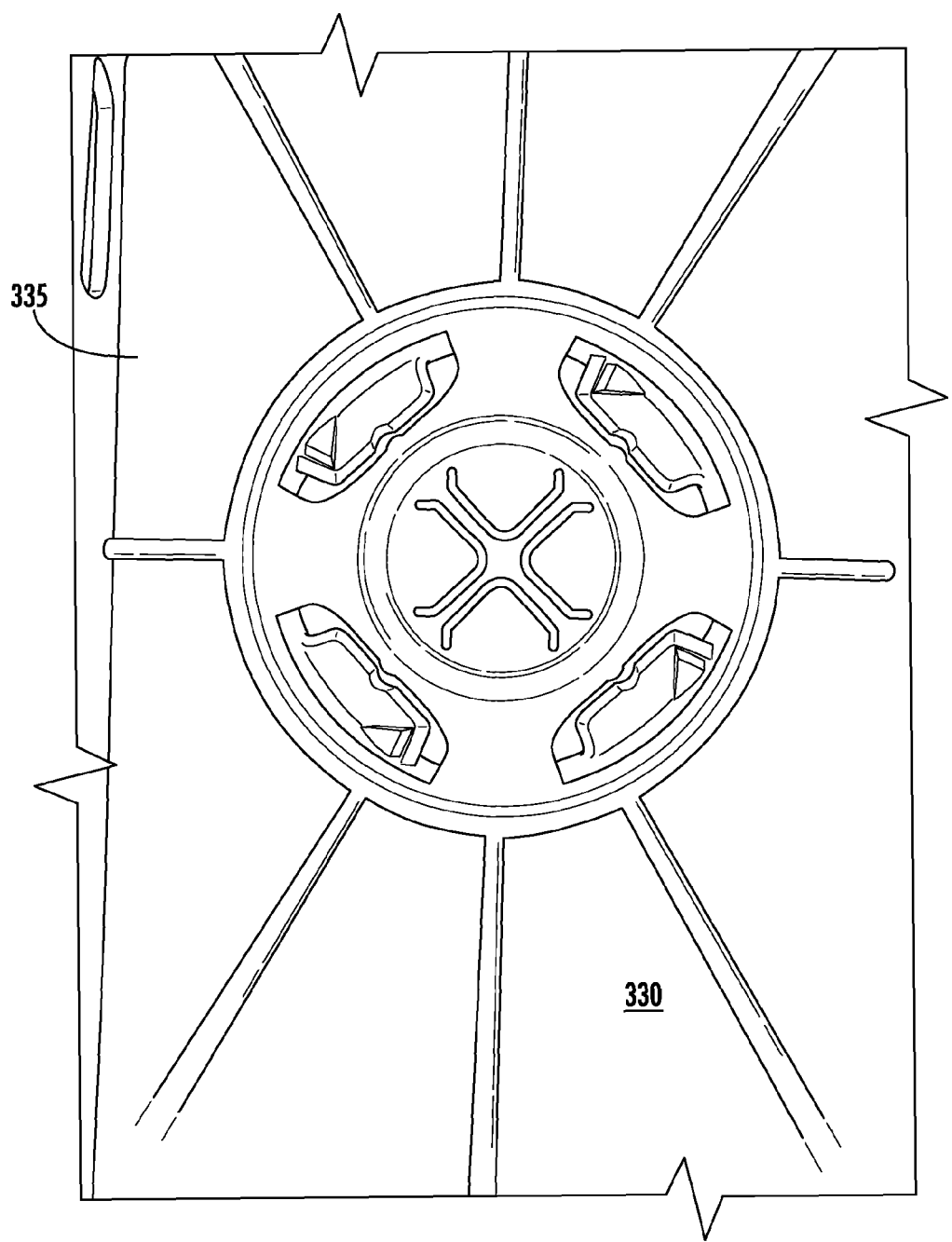
FIG. 20 is an enlarged front view of the electronic device case of FIG. 19.
Figure 20A:
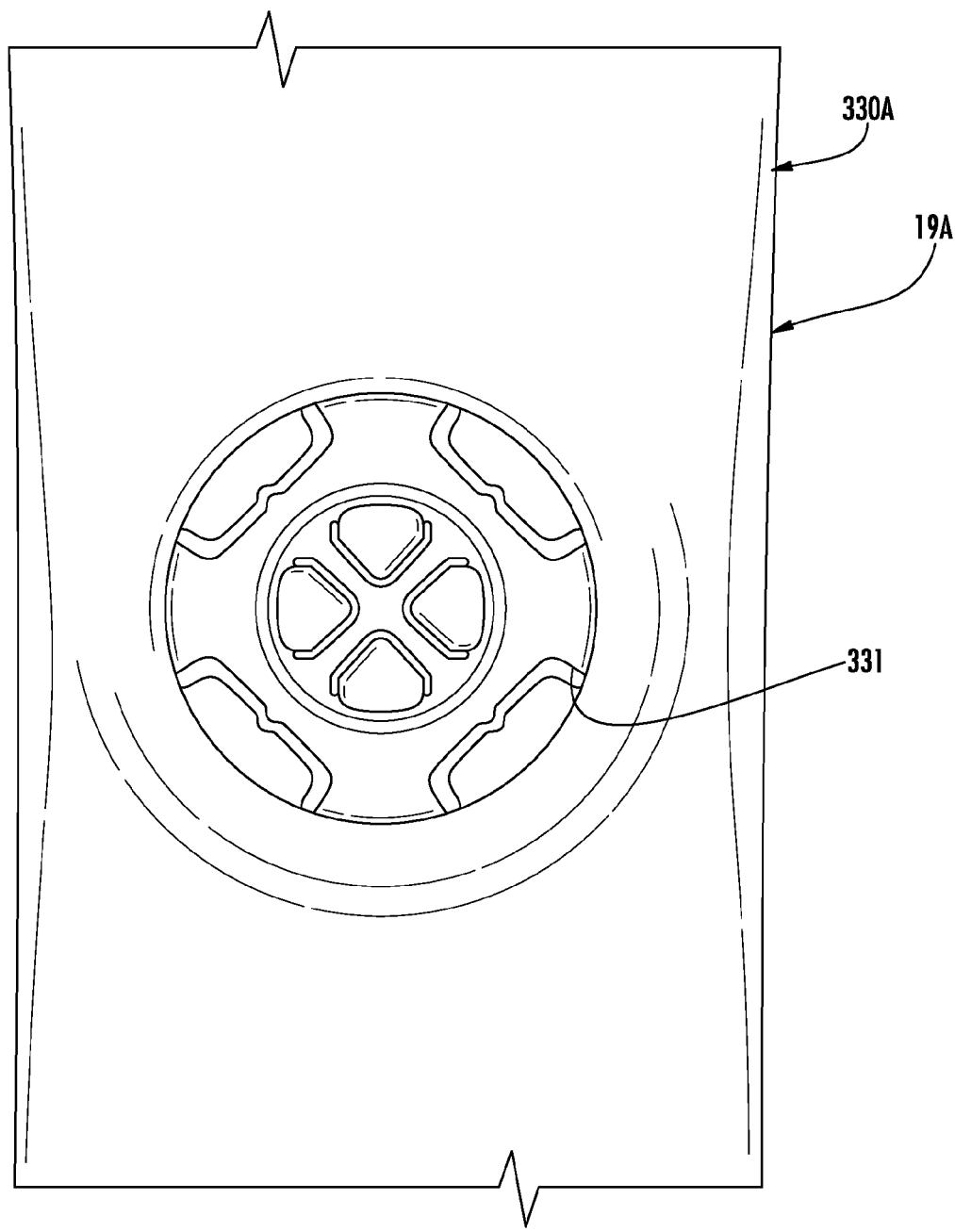
FIG. 20A is a rear view of another example electronic device case comprising another example female lock receiver.

FIGS. 14-20 illustrate female lock receiver 224 incorporated as part of electronic device case 330. As shown by a comparison of FIGS. 16 and 18, case 330 additionally comprises a rain cover or panel 333 across female receiver 224 within the interior 335 of case 330. Interior 335 configured to receive an electronic device, such as a smart phone, flash memory drive or other electronic device. FIGS. 14, 16 and 20 illustrate interior 335 of case 330. FIGS. 15, 17 and 19 illustrate an exterior backside of case 330. FIG. 19A illustrate an exterior backside of case 330A, an alternative implementation of case 330. Case 330A is similar to case 330 except that case 330A comprises openings or slots 331 about various components to facilitate flexing of such components.

Figure 21:
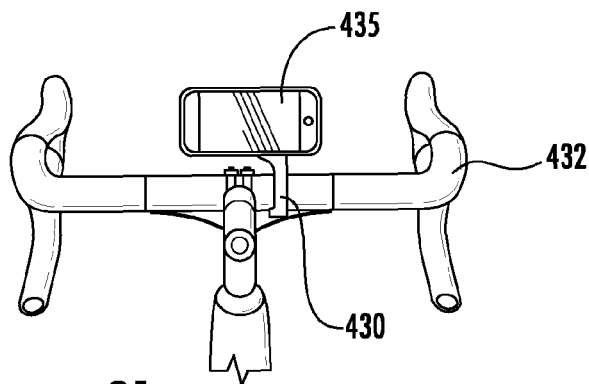
FIG. 21 is a fragmentary view of the electronic device case of FIG. 14 mounted to a male lock and supporting a first orientation with respect to a bicycle.
Figure 22:
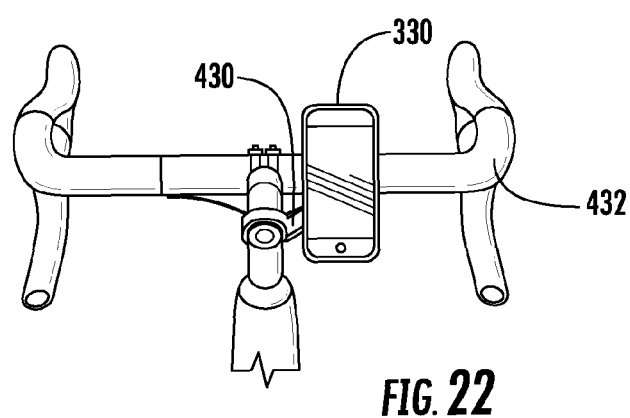
FIG. 22 is a fragmentary view of the electronic device case of FIG. 14 mounted to a male lock and supported in a second orientation with respect to a bicycle.
Figure 23:
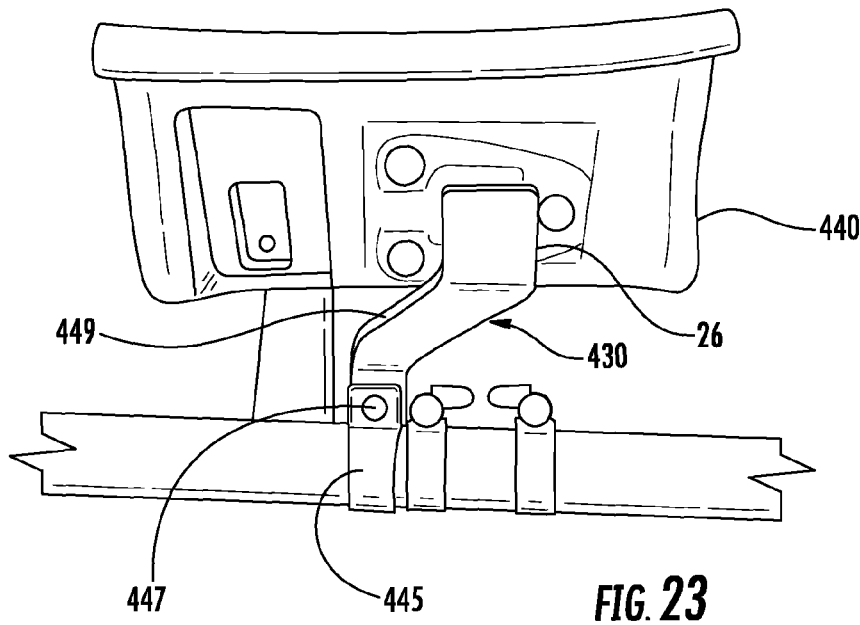
FIG. 23 is a fragmentary rear view of another example electronic device case having an example female lock receiver mounted to a male lock supported with respect to a bicycle.

FIGS. 21-28 illustrate lock 26 incorporated as part of bicycle mount 430. FIGS. 21 and 22 illustrate bicycle mount 430 mounted to two distinct portions of a bicycle 432 with lock 26 (shown in FIG. 23) received within and locked to female lock receiver 224. In other implementations, lock 26 is alternatively received within and lock to the different female lock receiver, such as lock receiver 20 or 120 described above. FIGS. 21 and 22 illustrate lock receiver 224 provided as part of case 330 which is illustrated as receiving and supporting a portable electronic device, such as the illustrated smart phone 435. FIG. 23 illustrate lock receiver 224 provided as part of a differently configured case 444 receiving a larger part of electronic device, such as a tablet computer or the like. As shown by FIGS. 21-23, mount 430 and lock 26 facilitate the mounting of different cases supporting different electronic devices at different positions with respect to a bike 432.

Figure 24:
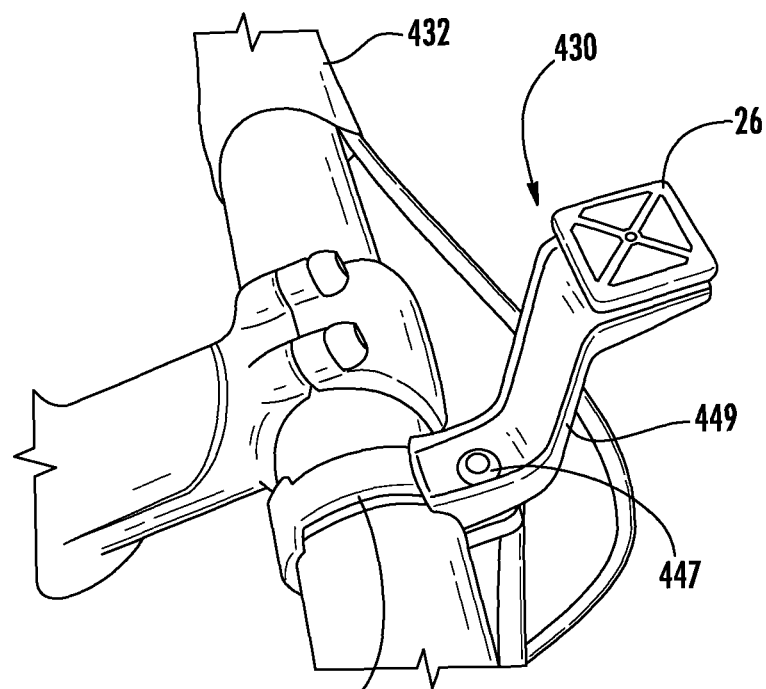
FIG. 24 is a fragmentary perspective view of the bicycle of FIG. 22 supporting an example mount having the mail lock of FIG. 6.
Figure 25:
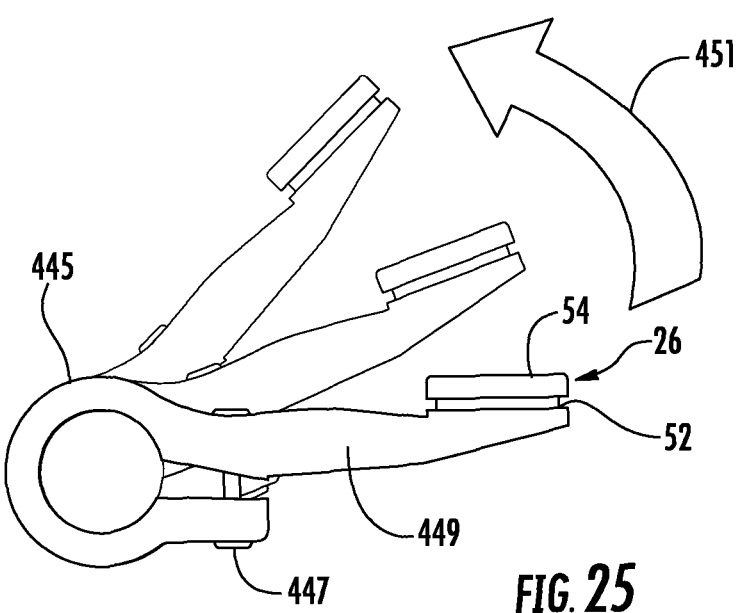
FIG. 25 is a side view illustrating the mount of FIG. 24 moved between various positions with respect to the bicycle.

FIGS. 23-25 illustrate mount 430 in detail. As shown by FIGS. 23-25, mount 430 comprises band 445, retainer 447 and arm 449. Band 445 comprise a strap, tube or loop to receive and surround a portion of bicycle 432. Retainer 447 comprise a structure to retain the loop formed by man 445 in a closed state about the encircled portion of bicycle 432. In the example illustrated, retainer 447 comprises a nut and bolt. In other implementations, retainer 447 may comprise a latch, snap connection, button, hook and loop fastener, hook or other releasable securement mechanism. Arm 449 extends from band 445 and supports lock 26. As shown by FIG. 25, loosening of band 445 facilitates rotation of mount 430 in the direction indicated by arrow 451 to adjust the angular positioning of mount 430 and that of case 330, 440. Once at a desired angular orientation, band 445 is once again tightened secure mount 430 in the attached case 330, 430, in the desired orientation. In another implementation, mount 430 may have other configurations.

Figure 28:
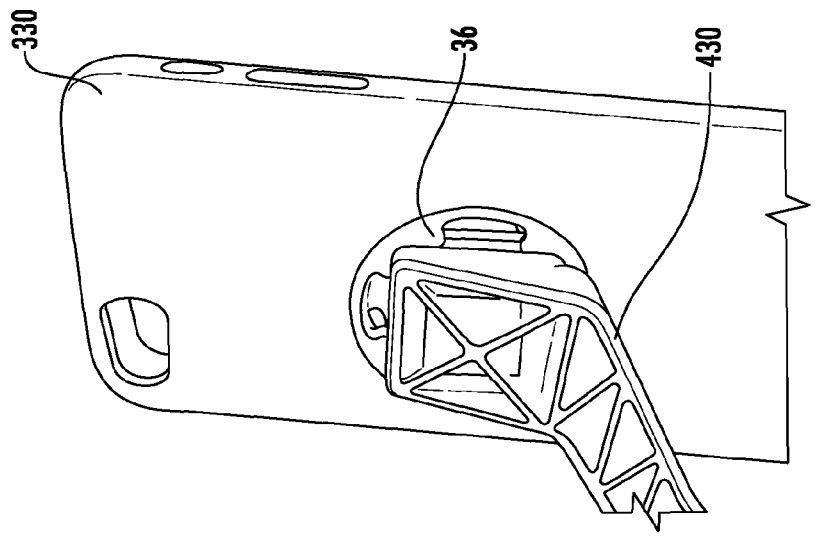
FIGS. 26-28 illustrate insertion of the example mount of FIG. 24 inserted into the electronic device case of FIG. 23 and actuation of the mail lock to a locked state.
Figure 27:
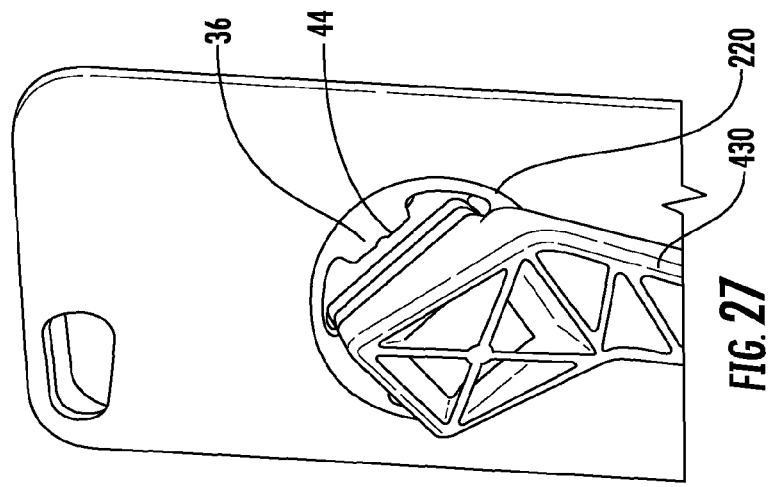
Figure 26:
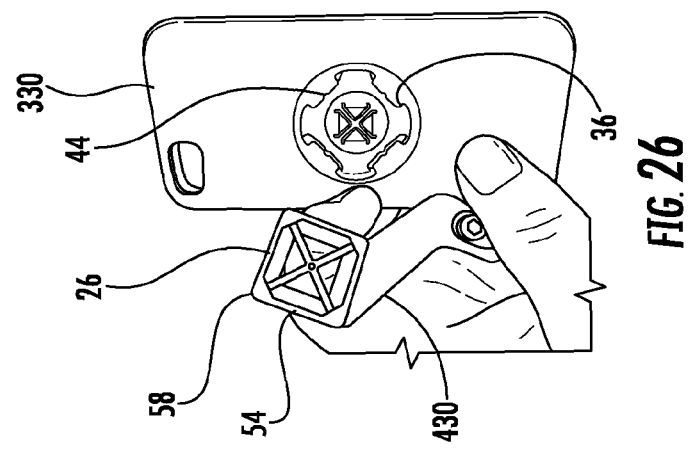

FIGS. 26-28 illustrate coupling or connection of mount 430 to case 330. FIG. 26 illustrates mount 430 in case 330 in a disconnected state. FIG. 27 illustrate lock 26 of mount 430 aligned with and being inserted through insertion opening 44 of female lock receiver 224. FIG. 28 illustrate rotation of case 330 and/or mount 430 relative to one another to position corners 58 of head 54 of lock 26 beneath or behind overhangs 36 (similar to the state shown in FIGS. 10-12), locking mount 430 to case 330.

Figure 29:
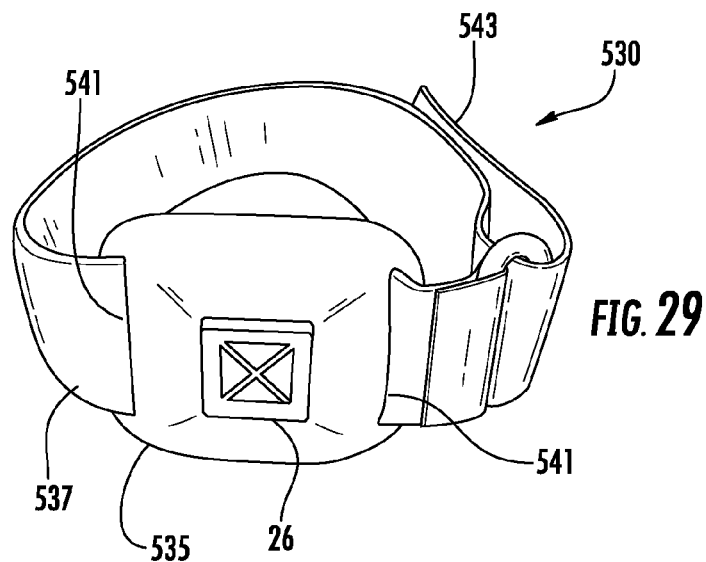
FIG. 29 is a perspective view of another example mount comprising the example male lock.
Figure 30:
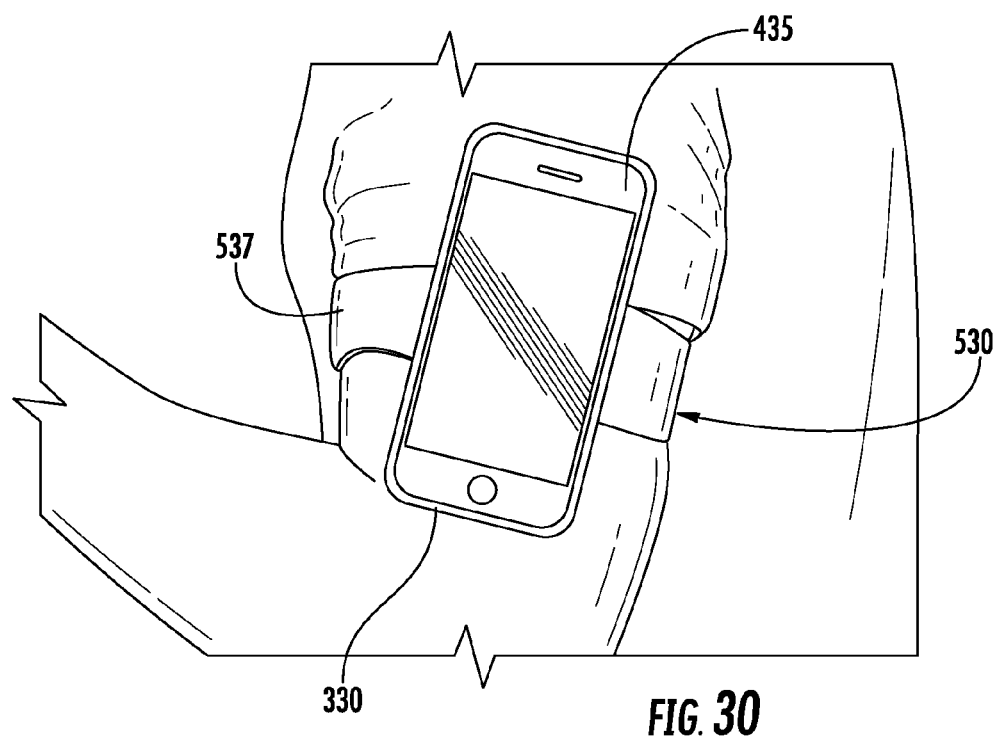
FIG. 30 is a perspective view of the example mount of FIG. 29 worn upon an arm of the user and connected to the example electronic device case of FIG. 23.
Figure 31:
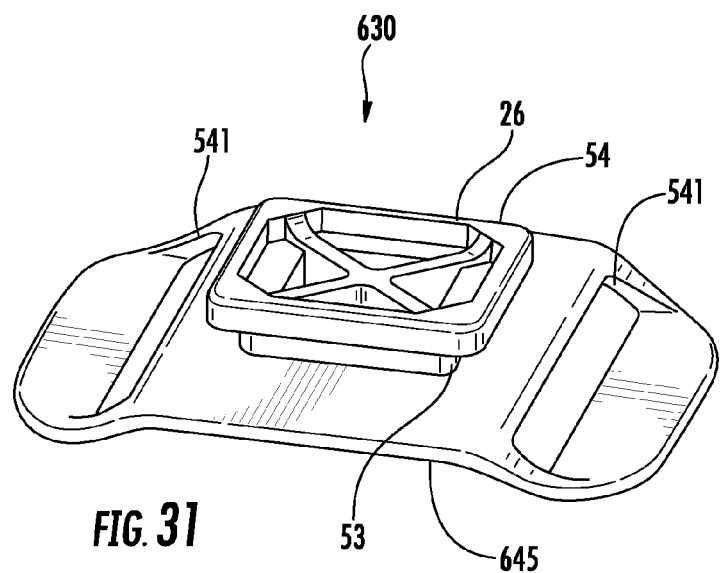
FIG. 31 a perspective view of another example mount comprising an example male lock.
Figure 32:
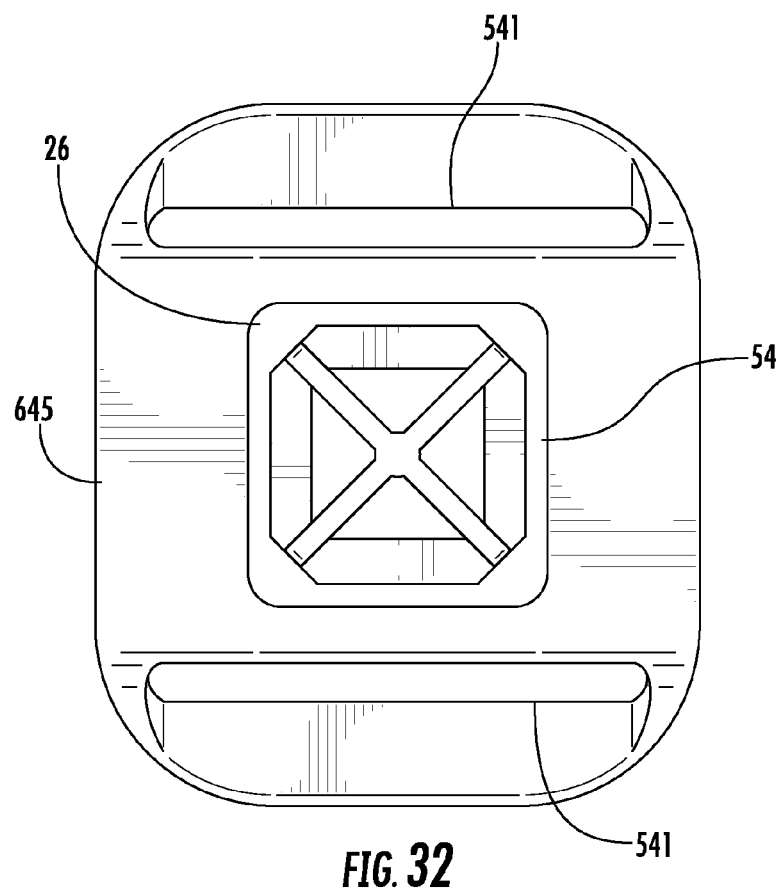
FIG. 32 is a top view of the example mount of FIG. 31.
Figure 33:
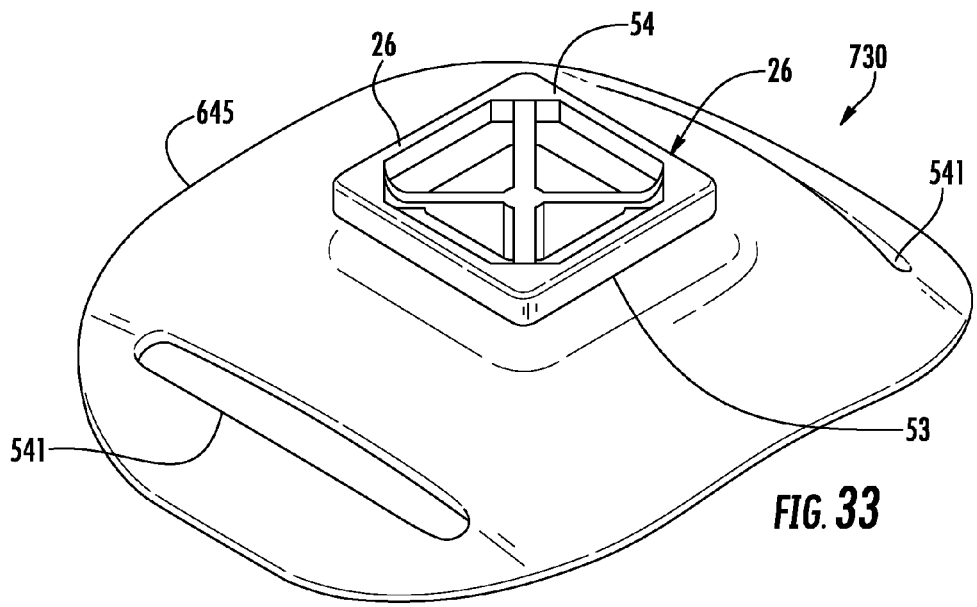
FIG. 33 is a perspective view of yet another example mount comprising an example male lock.
Figure 34:
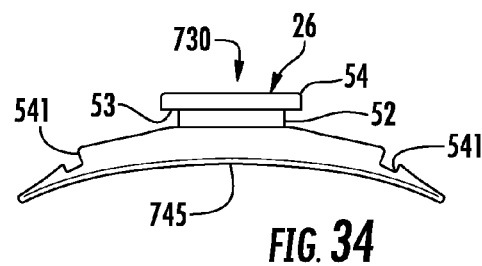
FIG. 34 is a side view of the mount of FIG. 33.
Figure 35:
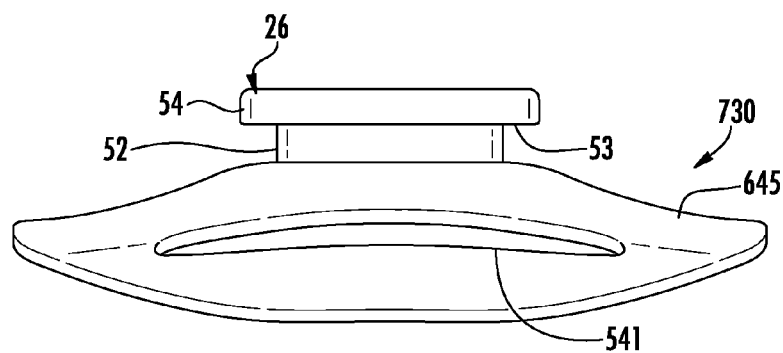
FIG. 35 is a second side view of the example mount of FIG. 33.

FIGS. 29 and 30 illustrate mount 530. FIG. 29 illustrates mount 530 in the form of an armband. FIG. 30 illustrate mount 530 securing case 330 against a person's upper arm. As shown by FIG. 29, mount 530 comprises buckle 535 and strap 537. Buckle 535 supports lock 26 includes a pair of slots are openings 541 through which strap 537 extends. Strap 537 extends through slots 541 and as opposite ends releasably secured to one another. In the example illustrated, 537 comprises a fabric or elastic strap having opposite ends 543 which include a hook and loop fastener for releasable securement of strap 537 about a person's arm or other structure, such as a stroller, backpack, bike, grocery cart or the like. In yet other implementations, ends 543 or releasably securable to one another using a button, snap, quick release side connector or other securement mechanism. As shown by FIG. 30, lock 26, supported by Buckle 535, mount two the rear of case 330 fashion similar to that shown in FIGS. 7-12 and FIGS. 26-28.

FIG. 31-32 and FIG. 33-35 illustrate mounts 630 and 730, respectively, to alternative implementations of mount 530. Mount 630 includes an underside recess 645 between slots 541 that is configured to receive a pad. Mount 730 is similar to mount 630 except the mount 730 comprises an arcuate or curved underside contour 745 that conforms to the contour of a person's arm, facilitating use of mount 730 without the aforementioned pad. As with mount 530, mount 630 and 730 support head 26 which is releasably securable to case 330 as shown in FIG. 30.

Figure 36:
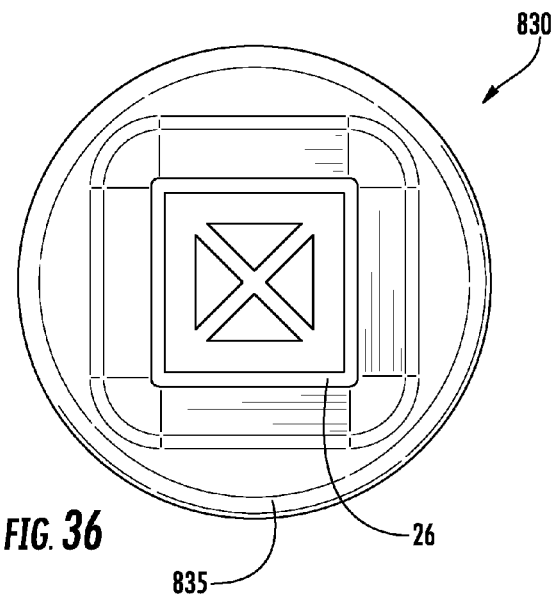
FIG. 36 is a top view of another example mount including the mail lock of 6.
Figure 37:
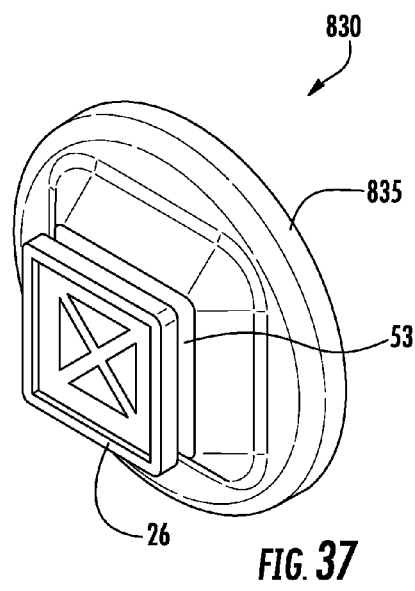
FIG. 37 is a perspective view of the mail lock of FIG. 36.
Figure 38:
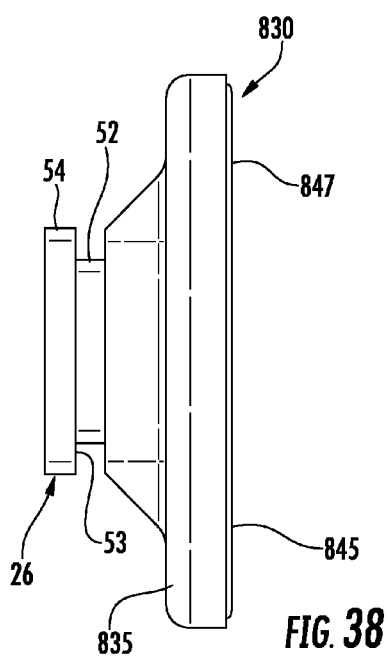
FIG. 38 is a side view of the mail lock of FIG. 36.

FIG. 36-38 illustrate mount 830. Mount 830 is similar to mounts 530, 630 and 730 except that the mount 830 is configured for mounting to a variety of structures using one or more releasable adhesives. Mount 830 comprises platform 835 which supports lock 26. Platform 835 comprises a backside 845 which is generally flat or planar, supporting an adhesive 847. As such, platform 835 is mounted to a variety of different flat surfaces, such as a console of a vehicle or other structures. In yet other implementations, backside 845 supports one or more suction cups which facilitate releasable securement of mount 830 to a substantially flat surface.

Figure 39:
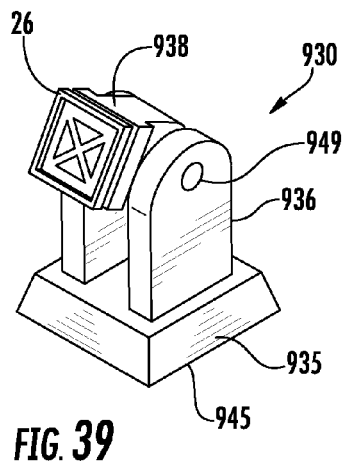
FIG. 39 is a perspective view of another example mount including the mail lock of FIG. 6.
Figure 40:
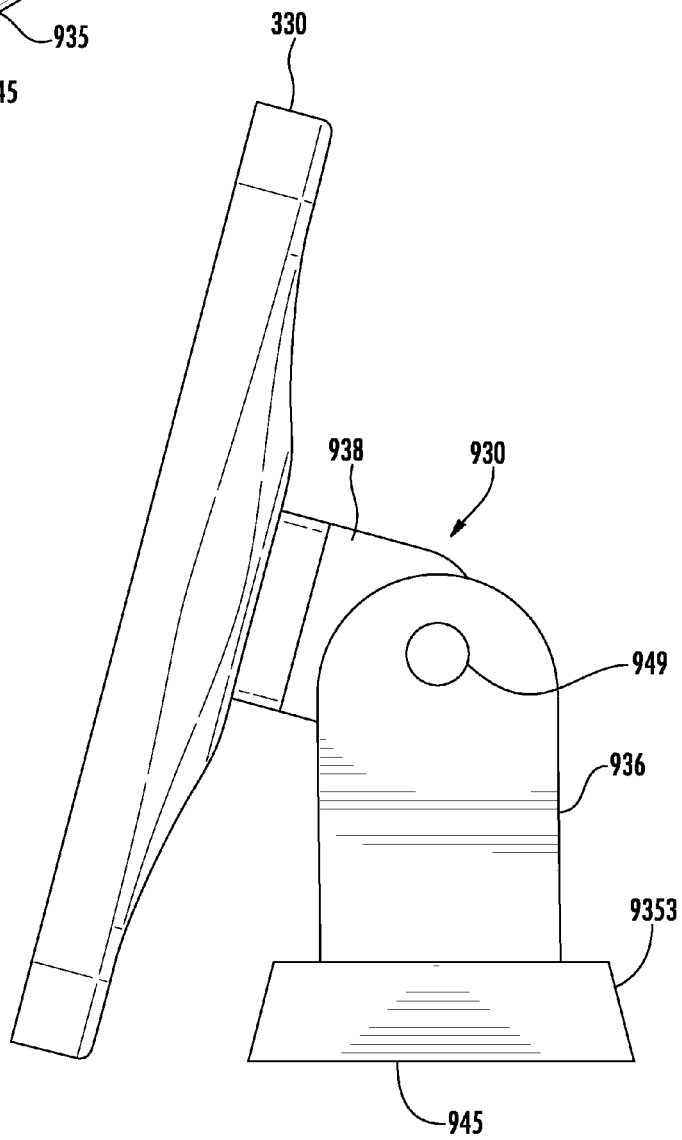
FIG. 40 is a side view of the amount of Figure and 39 connected to the example electronic device case of FIG. 14.

FIGS. 39 and 40 illustrate mount 930. Mount 930 mounts to a substantially flat surface while providing support for lock 26 at a variety of different user selectable angles. As shown by FIG. 9, mount 930 comprises platform 935, supports 936 and arm 938. Platform 935 is similar to platform 835 that platform 935 facilitates securement of mount 93 to a flat surface. In the example illustrated, platform 935 comprises an underside 945 code with a releasable pressure-sensitive adhesive. In another implementation, platform 935 comprises one or more suction cups or other releasable securement mechanisms.

Supports 936 extend from platform 935 and pivotably support arm 938. In the example illustrated, supports 936 comprise a pair spaced ears through which a rod or shaft 949 extends and serves as an axle for pivotal movement of arm 938. In other implementations, arm 938 is pivotably coupled to supports 936 in other fashions. Arm 938 extends from shaft 949 and supports lock 26. As shown by FIG. 40, lock 26 mounts to case 330 as described above with respect to FIGS. 7-12 and FIGS. 26-28. In other implementations, mount 930 may have other dimensions and other configurations.

FIGS. 41 and 42 illustrate mount 430 and its lock 26 being utilized with respect to an alternative female lock receiver 1024. As shown by FIG. 41, lock receiver 1024 comprises base 1025, guides 1026 and spring hook 1028. Base 1025 comprises a substrate a platform mountable to an electronic device case, such as case 1030. In other implementations, base 1025 is integrally formed as part of a single unitary body with case 1030. Case 1030 is configured to either house an electronic device or removably receive a self-contained electronic device.

Guides 1026 comprise bars, ribs or other structures projecting from base 1025 just to form a lock receiving channel 1030 therebetween. Guides 1026 guide sliding movement of lock 26 within channel 1030. As shown by FIG. 41A, each of guides 1026 comprise inverted L-shaped ribs which form a groove 1031 below a top 1034 of guides 1026 that slidably receives head 54 of lock 26 while the top 1034 of 1024 slide within the groove 53 (shown in FIG. 5) between head 54 and neck 52 alongside neck 52. When receiving lock 26, guides 1026 inhibit sideways movement of lock 26 relative to base 1025. Although illustrated as projecting from base 1025, guides 1026 may alternatively comprise side surfaces of a recess or channel formed within base 1025.

Spring hook 1028 comprises a resiliently supported hook or catch located within channel 1030 so as to resiliently deflect during insertion of head 54 within and along channel 1030 and so as to resiliently snapback into head 54 once aligned with a recess 60 within head 54. In the example illustrated, hook 1028 presently pops or snaps into one of cavity 60 (shown in FIG. 6) to retain head 26 within channel 1030 and prevent lock 26 from becoming accidentally dislodged from channel 1030. In the example illustrated, hook 1028 additionally comprises a lever 1036 projecting out of channel 1030 and manually actuatable to withdraw hook 1028 from cavity 60 to allow lock 26 to be withdrawn from channel 1030 and allow mount 430 to be separated from case 1030.

FIG. 42 illustrate insertion of lock 26 into channel 1030 with head 54 of lock 26 being received within groove 1031 and with groove 53 receiving top 1034 of guides 1026. As shown by FIGS. 41 and 42, the straight or linear sides of head 26 (such as with a polygon, such as a square) facilitate use of mount 430, or any of the above-described mounts having lock 26, with different female lock receivers, such as lock receiver 224 and/or lock receiver 1024. The configuration of lock 26 provides enhanced versatility.

For purposes of this disclosure, the phrase "configured to" denotes an actual state of configuration that fundamentally ties the stated function/use to the physical characteristics of the feature proceeding the phrase "configured to".

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a panel;
   a cavity extending into the panel;
   a plurality of overhangs cantilevered from a perimeter of the cavity;
   catches resiliently projecting from a portion of a floor of the cavity, the catches comprising a first catch and a second catch separated by a depression, wherein the overhangs define an insertion opening for a lock and wherein the catches and the depression are oriented with respect to the insertion opening such that the first catch and the second catch deflect by a first extent when engaged by a projection of the lock when the lock is positioned at a depth within the cavity below the overhangs while in alignment with the insertion opening and such that the first catch and the second catch deflect by a second extent, less than the first extent when the depression between the first catch and the second catch receives the projection of the lock when the lock is rotated to a position out of alignment with the insertion opening.

2. The apparatus of claim 1, wherein the portions of the floor of the cavity comprises a spring structure.

3. The apparatus of claim 1, wherein the insertion opening comprises two linear side edges opposite to one another.

4. The apparatus of claim 1, wherein the insertion opening comprises a square to receive a square-shaped lock, wherein corners of the square-shaped lock rotate beneath the overhangs.

5. The apparatus of claim 1, wherein each of the catches are pointed.

6. The apparatus of claim 4, wherein each of the catches comprises opposing beveled ramps.

7. The apparatus of claim 5, wherein the catches comprise two catches pointing towards one another and towards a center of the insertion opening.

8. The apparatus of claim 7, wherein the catches comprises four triangular-shaped catches pointing towards one another and towards a center of the insertion opening.

9. The apparatus of claim 1 further comprising the lock, wherein the lock comprises:
   a neck;
   a head supported by the neck, the head to be inserted through the insertion opening, the head comprising at least one recess located such that the at least one recess receives the catches when the head is out of alignment with the insertion opening.

10. The apparatus of claim 9, wherein the at least one recess comprises four triangular shaped recesses pointing towards a center of the head.

11. The apparatus of claim 9, wherein the head has two opposing linear sides.

12. The apparatus of claim 11, wherein the head is square.

13. The apparatus of claim 9 further comprising a mount supporting the lock, the mount comprising a sleeve to receive a bicycle tube.

14. The apparatus of claim 9 further comprising a mount supporting the lock, the mount comprising a buckle to receive a strap.

15. The apparatus of claim 9 further comprising a mount supporting a lock, the mount comprising:
a stand; and
an arm pivotably extending from the stand and supporting the lock.

16. An apparatus comprising:
a panel;
a cavity extending into the panel;
a plurality of overhangs cantilevered from a perimeter of the cavity; and
catches resiliently projecting from a portion of a floor of the cavity, wherein the overhangs define an insertion opening for a lock and wherein the catches are oriented with respect to the insertion opening such that the catches deflect by a first extent when the lock is positioned at a depth within the cavity below the overhangs and such that the catches deflect by a second greater extent during rotation of the lock to beneath the overhangs, wherein each of the catches are pointed.

17. The apparatus of claim 16, wherein the catches comprise two catches pointing towards one another and towards a center of the insertion opening.

18. The apparatus of claim 17, wherein the catches comprises four triangular-shaped catches pointing towards one another and towards a center of the insertion opening.

19. An apparatus comprising:
a panel;
a cavity extending into the panel;
a plurality of overhangs cantilevered from a perimeter of the cavity;
catches resiliently projecting from a portion of a floor of the cavity, wherein the overhangs define an insertion opening for a lock and wherein the catches are oriented with respect to the insertion opening such that the catches deflect by a first extent when the lock is positioned at a depth within the cavity below the overhangs and such that the catches deflect by a second greater extent during rotation of the lock to beneath the overhangs; and
the lock, wherein the lock comprises:
a neck;
a head supported by the neck, the head to be inserted through the insertion opening, the head comprising at least one recess located such that the at least one recess receives the catches during insertion of the head through the insertion opening and prior to rotation of the head to beneath the catches, wherein the at least one recess comprises four triangular shaped recesses pointing towards a center of the head.

* * * * *